(12) United States Patent
Kadur

(10) Patent No.: US 12,295,297 B1
(45) Date of Patent: May 13, 2025

(54) SYSTEMS AND METHODS FOR MANAGING PLANT IRRIGATION SCHEDULES

(71) Applicant: Aditya Kadur, San carlos, CA (US)

(72) Inventor: Aditya Kadur, San carlos, CA (US)

(*) Notice: Subject to any disclaimer, the term of this patent is extended or adjusted under 35 U.S.C. 154(b) by 0 days.

(21) Appl. No.: 18/921,072

(22) Filed: Oct. 21, 2024

(51) Int. Cl.
*A01G 25/16* (2006.01)

(52) U.S. Cl.
CPC ......... *A01G 25/165* (2013.01); *A01G 25/167* (2013.01)

(58) Field of Classification Search
CPC ............................ A01G 25/165; A01G 25/167
See application file for complete search history.

(56) References Cited

U.S. PATENT DOCUMENTS

| | | | | |
|---|---|---|---|---|
| 11,672,212 B2* | 6/2023 | Mewes | .................. | G06F 30/20 700/284 |
| 2022/0074908 A1* | 3/2022 | Cabigon | ............ | G01N 33/0098 |

FOREIGN PATENT DOCUMENTS

CN 113261446 A * 8/2021

* cited by examiner

*Primary Examiner* — Chad G Erdman
(74) *Attorney, Agent, or Firm* — EVERGREEN VALLEY LAW GROUP

(57) ABSTRACT

The present invention relates to systems and methods for managing plant irrigation schedules. The system includes an outer housing and an inner housing disposed in the outer housing. The inner housing receives growth media for supporting a plant. The system includes a first fluid reservoir and a second fluid reservoir. The second fluid reservoir is fluidically coupled to the first fluid reservoir via a control valve. The system further includes a plurality of sensors configured to detect ambient parameters of the growth environment and one or more parameters of the growth media. The system includes a control circuitry operatively coupled to the control valve, the plurality of sensors, and a terminal device. The control circuitry determines a fluid dispensing schedule from predefined plant profiles stored in the terminal device and operates the control valve to dispense the fluid to the growth media based on the fluid dispensing schedule.

24 Claims, 9 Drawing Sheets

SYSTEMS AND METHODS FOR MANAGING PLANT IRRIGATION SCHEDULES

TECHNICAL FIELD

The present invention relates to plant irrigation, and more particularly relates to systems and methods for managing plant irrigation schedules.

BACKGROUND

Plant irrigation depends on several factors including the type of soil, light luminosity, moisture content of soil, humidity, temperature, and the like. Further, plant irrigation may vary depending on geographical conditions. Thus, different plant species grow in different environments with distinct combinations of the above-mentioned factors. Some key factors for the survival and thriving of the plant are the soil moisture, incident light, air moisture, temperature, pests, and the like.

Many technologies have been developed to aid planters and horticulturalists through plant irrigation systems. The plant irrigation system may allow the user to set up and modify watering schedules. Though the plant irrigation system may reduce human intervention, the overall cost of purchasing and installing equipment may be considerably high. Further, separate maintenance of the equipment to ensure proper working may be required which further increases the cost of the plant irrigation system. Furthermore, the reliability of the plant irrigation system may be reduced due to human error while installing the equipment. Additionally, high energy requirements for the operation and maintenance of the equipment may not be economical. Further, the existing systems involve a pump for pumping water from the reservoir to the soil. The usage of the pump is energy-intensive and requires an external power connection.

Therefore, there is a need for methods and systems to improve plant irrigation and monitoring to overcome the aforementioned limitations, in addition to providing other technical advantages.

SUMMARY

Various embodiments of the present disclosure disclose systems and methods for managing plant irrigation schedules.

In an embodiment, a system is disclosed. The system includes an outer housing and an inner housing disposed in the outer housing. The inner housing is configured to receive growth media for supporting a plant. Further, the system includes at least one first fluid reservoir, and at least one second fluid reservoir. The at least one second fluid reservoir is fluidically coupled to the at least one first fluid reservoir via at least one control valve. The system further includes a plurality of sensors configured to detect ambient parameters of growth environment and one or more parameters related to the growth media. Furthermore, the system includes a control circuitry operatively coupled to the at least one control valve, the plurality of sensors, and a terminal device. The control circuitry is configured to at least receive, from the plurality of sensors, at least the ambient parameters of the growth environment and the one or more parameters related to the growth media. Further, the control circuitry is configured to determine the fluid dispensing schedule for dispensing fluid to the growth media based at least on the ambient parameters of the growth environment and the one or more parameters related to the growth media. The fluid dispensing schedule is determined based at least on determining a relevance metric by matching the ambient parameters and the one or more parameters related to the growth media with predefined plant profiles stored in the terminal device. The control circuitry is further configured to operate the at least one control valve for dispensing the fluid to the growth media based at least on the fluid dispensing schedule. Further, operating the at least one control valve enables the fluid stored in the at least one first fluid reservoir to flow into the at least one second fluid reservoir. The fluid in the at least one second fluid reservoir is dispensed to the growth media through a fluid dispenser mounted to the at least one second fluid reservoir.

In another embodiment, a method is disclosed. The method performed by a control circuitry includes receiving, from a plurality of sensors, at least ambient parameters of growth environment and one or more parameters related to the growth media. Further, the method includes determining the fluid dispensing schedule for dispensing fluid to the growth media based at least on the ambient parameters of the growth environment and the one or more parameters related to the growth media. The fluid dispensing schedule is determined based at least on determining a relevance metric by matching the ambient parameters and the one or more parameters related to the growth media with predefined plant profiles stored in a terminal device. The method further includes operating at least one control valve for dispensing the fluid to the growth media based at least on the fluid dispensing schedule. Further, operating the at least one control valve enables the fluid stored in the at least one first fluid reservoir to flow into at least one second fluid reservoir. The fluid in the at least one second fluid reservoir is dispensed to the growth media through a fluid dispenser mounted to the at least one second fluid reservoir.

In yet another embodiment, a system for determining a fluid dispensing schedule is disclosed. The system includes an outer housing and an inner housing disposed in the outer housing. The inner housing is configured to receive growth media for supporting a plant. Further, the system includes at least one first fluid reservoir and at least one second fluid reservoir. The at least one second fluid reservoir is fluidically coupled to the at least one first fluid reservoir via at least one control valve. The system further includes a plurality of sensors configured to detect ambient parameters of growth environment and one or more parameters related to the growth media. Furthermore, the system includes a control circuitry operatively coupled to the at least one control valve, the plurality of sensors, and a terminal device. The control circuitry is configured to at least receive, from the plurality of sensors, the ambient parameters of the growth environment and the one or more parameters related to the growth media. Further, the control circuitry is configured to determine the fluid dispensing schedule for dispensing fluid to the growth media based at least on the ambient parameters of the growth environment and the one or more parameters related to the growth media. The fluid dispensing schedule is determined based at least on determining a relevance metric by matching the ambient parameters and the one or more parameters related to the growth media with predefined plant profiles stored in the terminal device. The control circuitry is further configured to operate the at least one control valve for dispensing the fluid to the growth media based at least on the fluid dispensing schedule. Further, operating the at least one control valve enables the fluid stored in the at least one first fluid reservoir to flow into the at least one second fluid reservoir. The fluid in the at least one second fluid reservoir is dispensed to the growth media through a fluid dispenser mounted to the at least one second fluid reservoir. Furthermore, the fluid dispensing schedule includes at least a time period for operating the at least one control valve in an ON state for allowing the flow of the fluid from the at least one first fluid reservoir to the at least one second fluid reservoir to dispense the fluid to the growth media. The fluid dispensing schedule may further include a flowrate of the fluid from the at least one first fluid reservoir to the at least one second fluid reservoir, and a volume of the fluid to be dispensed to the growth media.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those skilled in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIG. 7.

Figure 1:
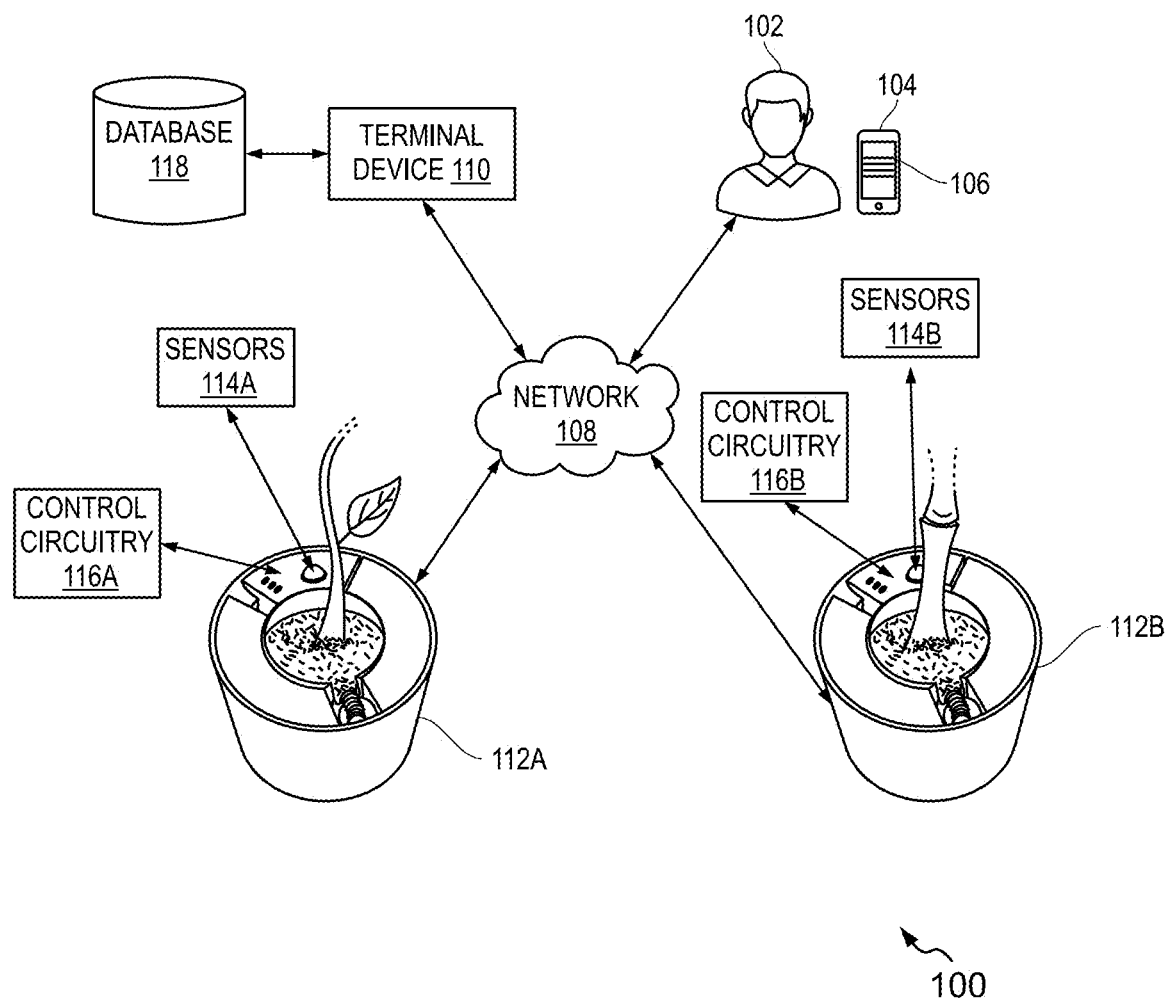
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 corresponds to a system for monitoring plant irrigation based on various parameters. As shown, the environment 100 includes a user 102. The user 102 is associated with a user device 104. The user device 104 may include, but not limited to, a mobile phone, a computer, a portable personal computer, and a tablet. Alternatively, the user 102 may be provided with any other user devices which serve the purpose.

The environment 100 further includes a plurality of pots (collectively referring to a pot 112A and a pot 112B). The pot 112A is equipped with a plurality of sensors 114A (also referred to as sensors 114A), and a control circuitry 116A. Further, the pot 112B is equipped with a plurality of sensors 114B (also referred to as sensors 114B), and a control circuitry 116B. The monitoring and irrigation of a plant equipped in the pot 112A is used for description purposes hereinafter. However, the operations performed for monitoring and irrigation of the plant in the pot 112A are applicable to monitoring and irrigation of the plant equipped in the pot 112B.

The environment 100 further includes a terminal device 110 and a database 118 associated with the terminal device 110. Each of the entities of FIG. 1 is communicably coupled to each other via a network 108. The network 108 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, Bluetooth low energy (BLE) network, a radio frequency (RF) network, a virtual network, and/or another suitable public and/or private network capable of supporting communication among the entities illustrated in FIG. 1, or any combination thereof.

Various entities in the environment 100 may connect to the network 108 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 108 may include multiple different networks, such as a private network made accessible by the server system, separately, and a public network (e.g., the Internet, etc.).

In one embodiment, the terminal device 110 is configured to perform one or more of the operations described herein. Specifically, the terminal device 110 is configured to host and manage an application 106 for monitoring and determining a fluid dispensing schedule for the plant (or a plant irrigation profile). In an embodiment, the user device 104 is equipped with an instance of the application 106. The application 106 is a set of computer-executable codes configured to provide a user interface (UI) to the user 102 for monitoring plant irrigation. In an embodiment, the application 106 renders services related to plant irrigation. The application 106 may include tools and techniques such as Internet of Things (IoT) and Artificial Intelligence (AI) techniques to monitor the plant irrigation which will be explained further in detail.

The terminal device 110 may be communicably connected with the plurality of pots (e.g., the pots 112A and 112B) for monitoring plant irrigation. Further, the plurality of pots may be made of clay, ceramic, plastic, metal, wood, concrete, fiberglass, and any other composite material. For example, the terminal device 110 may be communicably coupled with the pot 112A and the pot 112B through the network 108. The network 108 may include various wired or wireless networks. In this scenario, the network 108 may be the wireless network, including but not limited to a Bluetooth low energy (BLE) network. As explained above, the pot 112A is equipped with the sensors 114A and the control circuitry 116A. Further, the pot 112B is equipped with the sensors 114B and the control circuitry 116B. Some non-limiting examples of the sensors 114A and the sensors 114B may include a temperature sensor, a humidity sensor, a moisture sensor, a light luminosity sensor, and the like.

In one scenario, the terminal device 110 may be associated with the database 118 for long-term storage of sensor data captured by the sensors 114A. In an embodiment, the terminal device 110 may be a separate entity in the environment 100 and communicably coupled to the control circuitry 116A via the network 108. In one embodiment, the terminal device 110 may be embodied or hosted in a cloud infrastructure (not shown in figures). Further, the control circuitry 116A may process the sensor data and render the status of the plant condition or the growth media condition of the pot 112A in the application 106. The control circuitry 116A may store the status of the plant condition and the growth media condition of the pot 112A in the database 118 for future use. The database 118 further provides an ideal watering schedule (or the fluid dispensing schedule) to the control circuitry 116A which will be explained further in detail. The database 118 may be hosted at least on the terminal device 110 and a cloud storage.

The user 102 may be an individual who wishes to monitor the plant irrigation using the services of the application 106. In one scenario, the user 102 receives the sensor data from the pot 112A through the application 106 equipped in the user device 104. The irrigation schedule of the pot 112A may be controlled by the control circuitry 116A based on the sensor data. In particular, the control circuitry 116A is configured to control the dispersal of fluids (e.g., water) to a growth media of the pot 112A. The control circuitry 116A may control the dispersal of fluids by at least one control valve (not shown in FIG. 1). Further, the control circuitry 116A may receive sensor data related to environmental conditions and growth media conditions of the pot 112A from the sensors 114A. Based on the sensor data received from the sensors 114A, the control circuitry 116A is configured to determine the fluid dispensing schedule by matching the sensor data with the database 118. Specifically, the control circuitry 116A communicates with the terminal device 110 for determining the fluid dispensing schedule for the plant equipped in the pot 112A. The terminal device 110 may compare the environmental condition and the growth media condition of the pot 112A and determine the fluid dispensing schedule for the plant equipped in the pot 112A. In addition, the fluid dispensing schedule may be determined based at least on the type of the plant, an ideal fluid dispensing schedule of the plant, fluid requirement for the plant, and the like. Thereafter, the control circuitry 116A is configured to operate the at least one control valve to dispense the fluid to the growth media in the pot 112A based on the fluid dispensing schedule. For example, the fluid dispensing schedule may suggest dispensing the fluid (i.e. water) to the plant for a specified volume (2 Liters) for a predefined time (20 minutes) at three intervals (for every 2 hours). In this scenario, the control circuitry 116A operates the at least one control valve every two hours for 20 minutes to dispense 2 Liters of water to the plant equipped in the pot 112A. It is to be noted that the control circuitry 116A may adjust the flow rate of the water corresponding to the fluid dispensing schedule.

The number and arrangement of systems, devices, and/or networks shown in FIG. 1 are provided as an example. There may be other systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices.

Figure 2A:
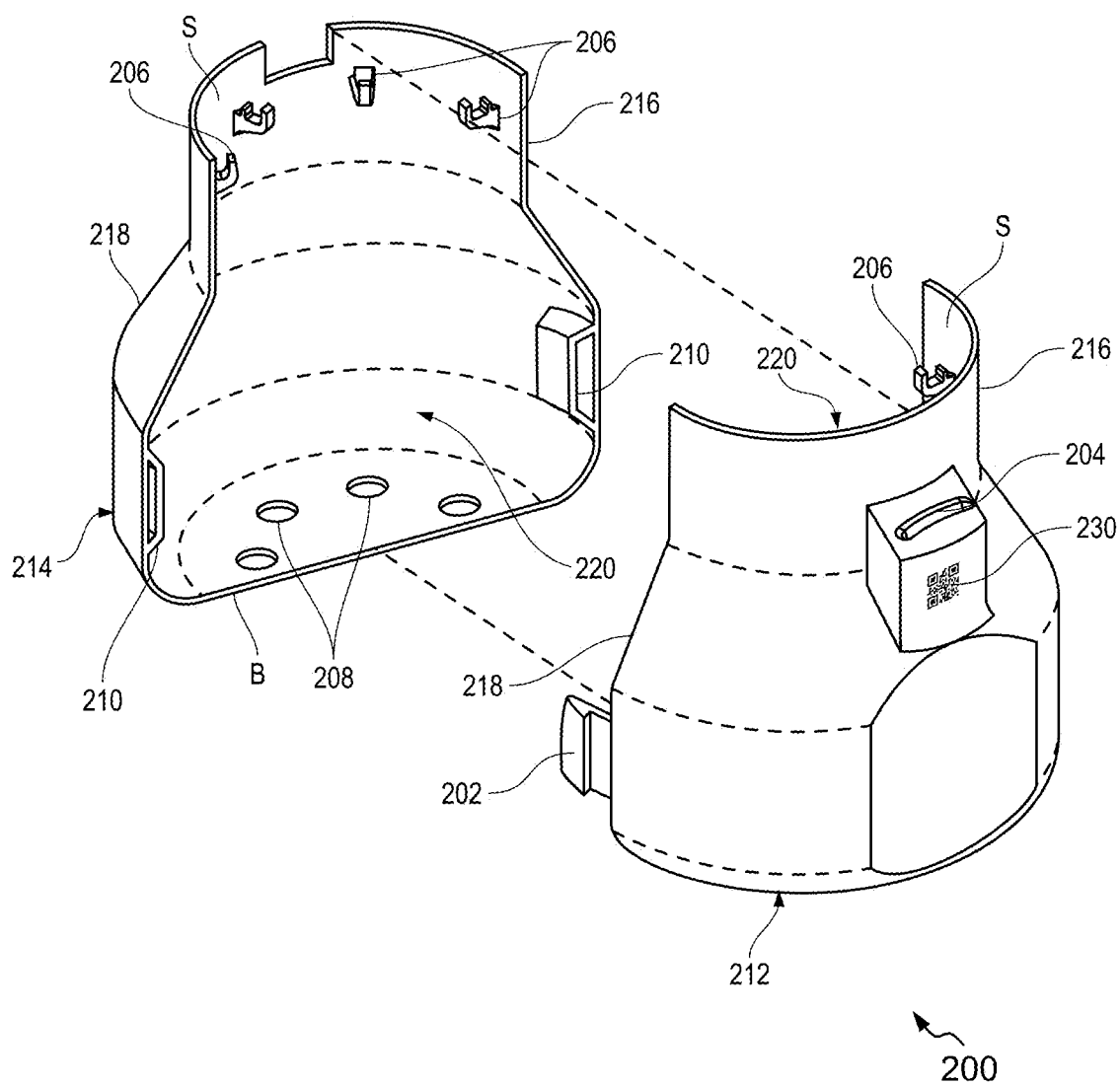
FIG. 2A illustrates a schematic representation of an inner housing of a pot, in accordance with an embodiment of the present disclosure.

FIG. 2A illustrates a schematic representation of an inner housing 200 of a pot (e.g., the pot 112A), in accordance with an embodiment of the present disclosure. The inner housing 200 may be a shell-like structure. In particular, the inner housing 200 includes at least one first part 212 and at least one second part 214. The at least one first part 212 includes at least one engaging member 202 and the at least one second part includes at least one complementary engaging member 210. The at least one engaging member 202 of the at least one first part 212 is removably engaged with the at least one complementary engaging member 210 of the at least one second part 214. The configuration of removably engaging the at least one engaging member 202 and the at least one complementary engaging member 210 ensures detachable coupling of the at least one first part 212 and the at least one second part 214 to form the inner housing 200. The at least one engaging member 202 and the at least one complementary engaging member 210 may be made of at least plastic, metal, metal alloy, ceramic, and the like. Further, the at least one engaging member 202 and the at least one complementary engaging member 210 conform to a snap-fit arrangement. Alternatively, any other type of coupling members such as bolt and screw arrangement, interference fit fasteners, and magnetic fasteners may be used for detachably coupling the at least one first part 212 and the at least one second part 214 to form the inner housing 200.

Further, the inner housing 200 is configured with a growth media reservoir (see, 220 of FIG. 2A). The growth media reservoir 220 is adapted to receive a growth media (see, 234 of FIG. 2B) for supporting the plant in the pot 112A. The growth media 234 may include soil, potting mix, peat moss, coco-coir, sand and gravel, and the like. The inner housing 200 may be configured to reinforce and support all parts of the pot 112A.

Furthermore, the inner housing 200 includes a neck portion 216 and a shoulder portion 218. The neck portion 216 of the inner housing 200 may be equipped with a plurality of retainer members 206 (also referred to as retainer members 206). Specifically, an inner surface (exemplarily represented as 'S') of the neck portion 216 is configured with the plurality of retainer members 206 (as shown in FIG. 2A). The plurality of retainer members 206 may be configured to support a fluid dispenser (see, 228 of FIG. 2B). Further, each retainer member of the plurality of retainer members 206 may be configured at regular intervals. In an embodiment, the retainer members 206 may be configured corresponding to the positioning of the fluid dispenser 228. Further, the neck portion 216 and the shoulder portion 218 of the inner housing 200 may be configured to receive at least one first fluid reservoir 224, at least one second fluid reservoir 226, the plurality of sensors 114A, and the control circuitry 116A. The plurality of sensors 114A may be housed in a casing (see, 236 of FIG. 2B).

Further, the inner housing 200 may further include a plurality of holes 208. In one embodiment, the holes 208 (also referred to as holes 208) may be configured at a bottom surface (exemplarily depicted as 'B') of the inner housing 200. The holes 208 may allow ventilation of air, drainage of fluids, moisture, and evaporation from the growth media 234. In another embodiment, the holes 208 may be configured over the circumference of the inner housing 200. Such configuration of the inner housing 200 may reduce weight and material usage in manufacturing the inner housing 200. In an embodiment, the plurality of sensors 114A may be configured to detect runout of the fluid from the plurality of holes 208.

Figures 2B, 2C:
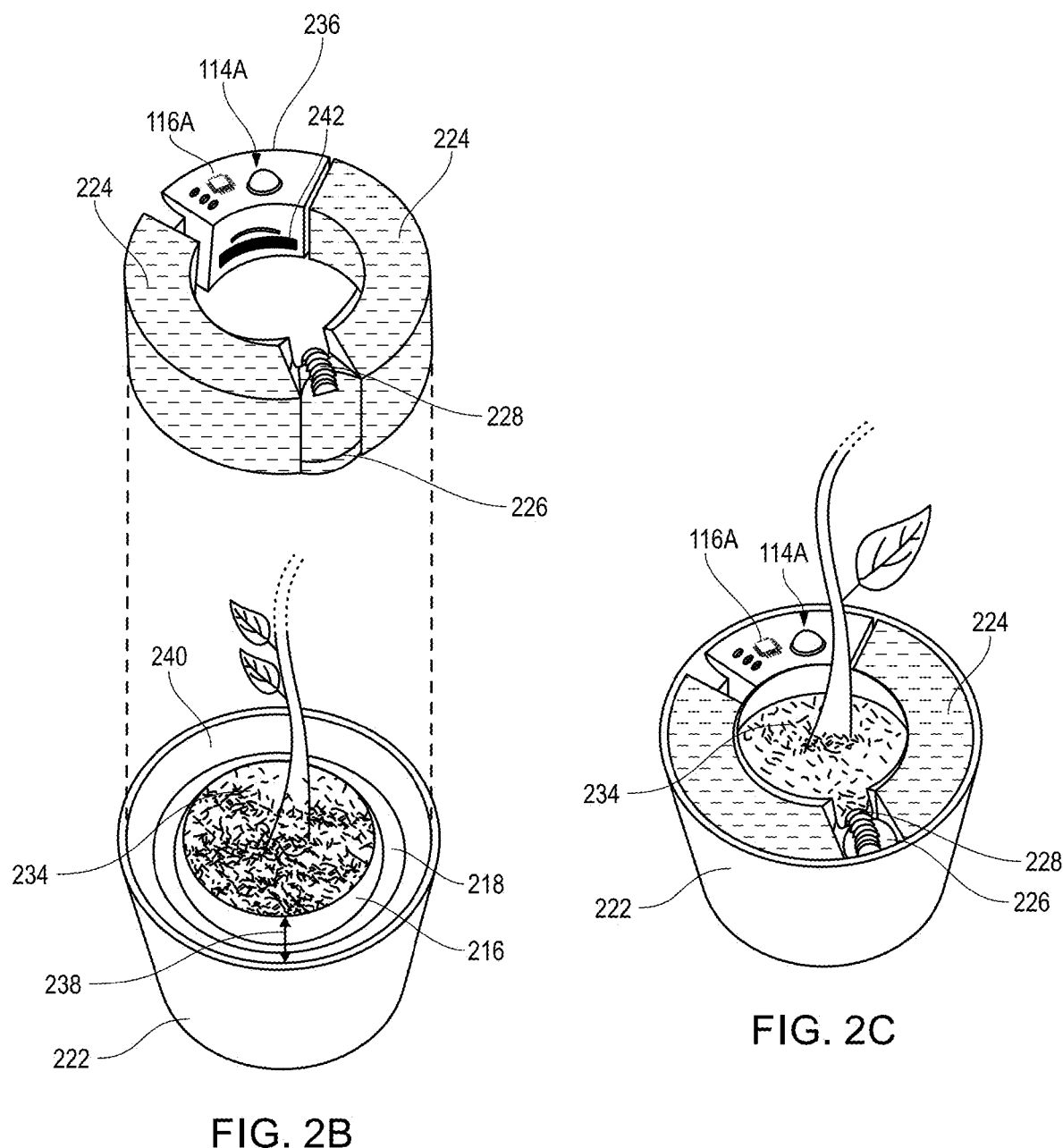
FIGS. 2B and 2C illustrate a schematic representation of an outer housing of the pot, at least one first fluid reservoir, at least one second fluid reservoir, and a casing, in accordance with an embodiment of the present disclosure.

As explained above, the neck portion 216 and the shoulder portion 218 of the inner housing 200 may be configured to receive the at least one first fluid reservoir 224, the at least one second fluid reservoir 226, the plurality of sensors 114A, and the control circuitry 116A. In other words, the at least one first fluid reservoir 224 and the at least one second fluid reservoir 226 may be disposed in an outer housing 222 and supported on the inner housing 200. Specifically, the at least one first fluid reservoir 224, the at least one second fluid reservoir 226, and the casing 236 including the plurality of sensors 114A and the control circuitry 116A are disposed in a region (see, 238 of FIG. 2B) defined between the neck portion 216 and the shoulder portion 218 of the inner housing 200 and an inner circumferential surface (see, 240 of FIG. 2B) of the outer housing 222, while the inner housing 200 is inserted into the outer housing 222 (as shown in FIG. 2C). It is to be noted that the outer housing 222 may be configured in conformity with the dimensions of the inner housing 200 to accommodate the inner housing 200 therein. The outer housing 222 may be configured to accommodate the inner housing 200 including the growth media 234. The outer housing 222 may be made of clay, ceramic, plastic, metal, wood, concrete, fiber glass, and any other composite material.

In an embodiment, the at least one first fluid reservoir 224 may be configured with a plurality of orifices (not shown in figures) at a top surface of the at least one first fluid reservoir 224. The at least one first fluid reservoir 224 configured with the orifices may be configured to collect rainwater when the pot (e.g., the pot 112A) is placed in the outside environment. In an embodiment, the at least one first fluid reservoir 224 may be configured with a removable top surface (e.g., partially removable or fully removable) for ease of refilling the at least one first fluid reservoir 224 with the fluid.

Figure 3A:
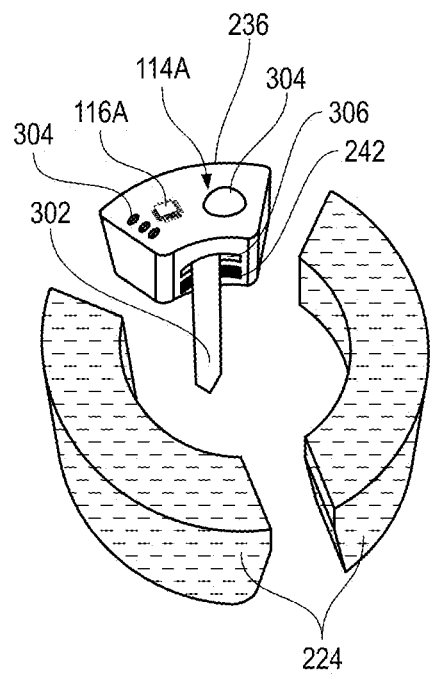
FIG. 3A illustrates a schematic representation of the at least one first fluid reservoir, and the casing equipped with a control circuitry and sensors, in accordance with an embodiment of the present disclosure.
Figure 3B:
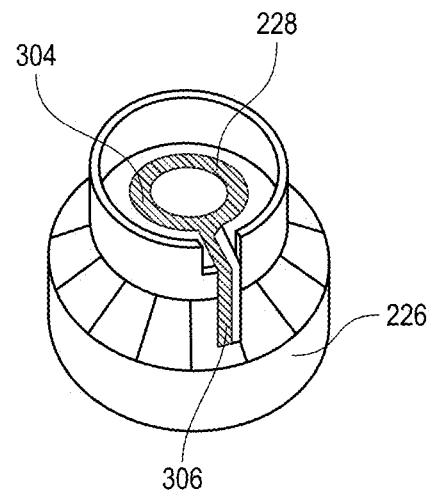
FIG. 3B illustrates a schematic representation of the at least one second fluid reservoir equipped in the pot, in accordance with an embodiment of the present disclosure.
Figure 3C:
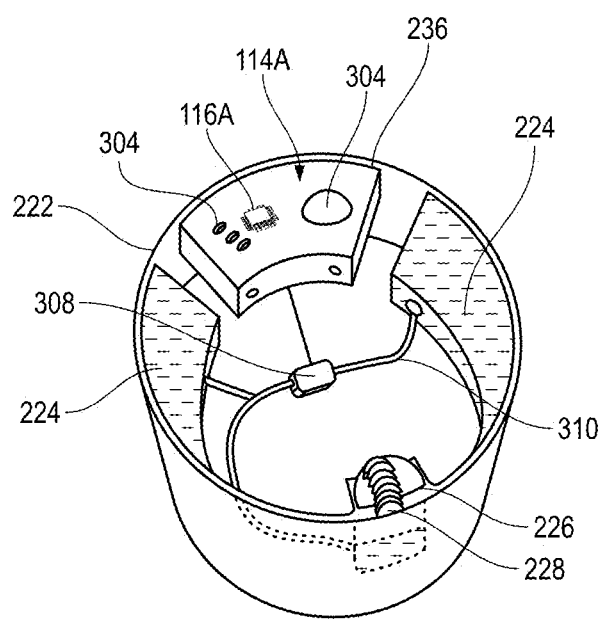
FIG. 3C illustrates a schematic representation of the pot equipped with the at least one first fluid reservoir, the at least one second fluid reservoir and the casing, in accordance with an embodiment of the present disclosure.

Referring to FIG. 3A in conjunction with FIG. 2B, the at least one first fluid reservoir 224 may be fluidically coupled to the at least one second fluid reservoir 226 via at least one control valve (see, 308 of FIG. 3C). For example, the at least one fluid control valve 308 may include a two-way valve. Alternatively, the at least one control valve 308 may include other types of valves such as a gate valve, a ball valve, a butterfly valve, a diaphragm valve, and a check valve. In an embodiment, the at least one first fluid reservoir 224 may include two first fluid reservoirs. The two first fluid reservoirs of the at least one first fluid reservoir 224 are fluidically connected to each other through fluid conduits 310 (as shown in FIG. 3C). In another embodiment, the at least one first fluid reservoir 224 may include a fluid reservoir of a unitary structure. Further, the at least one first fluid reservoir 224 may be configured to store the fluid. In an example scenario, the at least one first fluid reservoir 224 may be connected to an external fluid reservoir (not shown in figures) for receiving the fluid therein. In another example scenario, the at least one second fluid reservoir 226 may be fluidically connected to the external fluid reservoir for dispensing the fluid received from the external fluid reservoir onto the growth media 234. In another example scenario, a user (such as the user 102) may manually fill the fluid in the at least one first fluid reservoir 224. The at least one first fluid reservoir 224 may be made of lightweight materials with sufficient reinforcement to hold the fluid therein without causing deformation of the at least one first fluid reservoir 224.

Further, the plurality of sensors 114A is housed in the casing 236. The plurality of sensors 114A may include a first sensor (see, 302 of FIG. 3A), a second sensor (see, 304 of FIG. 3A), and a third sensor (see, 406 of FIG. 4A). It is to be noted that the first sensor 302 and the second sensor 304 of the sensors 114A are housed in the casing 236.

Specifically, the first sensor 302 housed in the casing 236 may extend out of the casing 236 through an opening 306 defined in the casing 236 and inserted through a slit (see, 204 of FIG. 2A) defined in the inner housing 200. Further, a portion of the first sensor 302 inserted vertically through the slit 204 is substantially positioned (i.e., submerged) in the growth media 234 stored in the inner housing 200. In other words, to facilitate the insertion and removal of the first sensor 302, the inner housing 200 is equipped with the slit 204 to allow the first sensor 302 to slide in and out with minimal disturbance to the contained growth media 234. In one embodiment, if the growth media 234 is natural earth, then the pot 112A, the inner housing 200, and the outer housing 222 may not be required to equip the plant. In this scenario, the first sensor 302 may be inserted to free Earth. For example, the first sensor 302 may include a moisture probe. The first sensor 302 is configured to detect one or more parameters related to the growth media 234. The one or more parameters may include, but not limited to, moisture content of the growth media 234, pH level, evapotranspiration from the growth media, fluid holding capacity of the growth media, nutrient content of the growth media.

Further, the second sensor 304 may be configured to detect the ambient parameters of the growth environment. Herein, the growth environment refers to the environment (i.e., within the growth media 234 and outside of the growth media 234) around the plant equipped in the pot 112A. For example, the second sensor 304 may include, but not limited to, a temperature sensor, a luminosity sensor, and a humidity sensor. The ambient parameters may include at least ambient temperature, humidity, and light intensity. In an embodiment, the second sensor 304 may be mounted externally (in proximity to the pot 112A) to detect the ambient parameters of the environment.

Furthermore, the third sensor 406 may be disposed in the inner housing 200. In particular, the third sensor 406 may be positioned in the at least one first fluid reservoir 224. For example, the third sensor 406 may include a capacitive sensor. The third sensor 406 may be configured to detect fluid level measurement and conductance in the at least one first fluid reservoir 224. In an embodiment, the capacitive sensor may detect changes in capacitance between two conductive plates or electrodes (not shown in figures). Upon immersing the third sensor 406 in the fluid, a dielectric constant of the fluid changes the capacitance. Further, the conductive sensor (i.e., the third sensor 406) converts the change in capacitance into an electric signal which may be further processed to determine the fluid level in the at least one first fluid reservoir 224. The electric signal may be used to trigger alarms, control pumps and monitor fluid levels in real time. The third sensor 406 may detect the fluid level in the at least one first fluid reservoir 224 without direct contact with the fluid, which may be beneficial for preventing contamination and may ensure the durability of the third sensor 406. Further, the conductance is a purely optional environment variable that could be used to detect the amount of certain electrolytes mixed into the fluid reservoirs (e.g., the at least one first fluid reservoir 224). For example, the conductance determination indicates the amount of fertilizer in the water.

In an embodiment, the third sensor 406 determines that the fluid level in the at least one first fluid reservoir 224 is less than a predefined level. In this scenario, the control circuitry 116A may transmit an alert signal to the terminal device 110 to indicate the fluid level in the at least one first fluid reservoir 224 is less than the predefined level. Additionally, the control circuitry 116A may transmit a notification through the application 106 equipped in the user device 104 for alerting the user 102 about the fluid level in the at least one fluid reservoir 224 is less than the predefined level. In an example scenario, the external fluid reservoir and the at least one first fluid reservoir 224 may be fluidically coupled through a valve (not shown in figures) communicably coupled to the control circuitry 116A. In this scenario, the control circuitry 116A may actuate the valve in case of determining the fluid level in the at least one fluid reservoir 224 is less than the predefined level. To that effect, the fluid from the external fluid reservoir flows to the at least one first fluid reservoir 224 until the fluid in the at least one first fluid reservoir 224 is filled to the predefined level or to the fullest capacity of the at least one first fluid reservoir 224.

Referring to FIG. 3A in conjunction with FIG. 2A, the inner housing 200 may be incorporated with a unique identifier 230. In other words, the unique identifier 230 may be embedded on a portion (e.g., an outer circumferential surface 232) of the inner housing 200. Specifically, the unique identifier 230 is configured on a portion of the inner housing 200 proximate to the slit 204 configured on the inner housing 200. For example, the unique identifier 230 may be a Radio Frequency Identification (RFID) tag embedded on the inner housing 200. The unique identifier 230 may be encoded with plant information associated with the plant equipped in the inner housing 200. The plant information may include at least a plant type, plant category, and plant growth phase. For example, the plant equipped in the inner housing 200 may be a rose plant, hence, the plant information related to the rose plant is encoded in the unique identifier 230 and embedded onto the inner housing 200 for identification of the plant in a seamless manner. In particular, the system may include a unique identifier reader 242. In an embodiment, the unique identifier reader 242 may be configured in the casing 236. Thus, the unique identifier 230 is positioned in line (or parallel) with the unique identifier reader 242 while the inner housing is disposed in the outer housing 222 (as shown in FIG. 2C). In this scenario, the unique identifier reader 242 is configured to retrieve the plant information of the plant equipped in the inner housing 200 upon scanning the unique identifier 230. Alternatively, the unique identifier 230 and the unique identifier reader 242 may be configured at any suitable location in the pot 112A as per the requirement. Further, the control circuitry 116A is communicably coupled to the unique identifier reader 242. Hence, the retrieved plant information by the unique identifier reader 242 is accessible by the control circuitry 116A. Further, the control circuitry 116A may be configured to render the plant information in the application 106 equipped in the user device 104 of the user 102. Furthermore, the control circuitry 116A is configured to determine the fluid dispensing schedule based on the plant information being retrieved by scanning the unique identifier 230.

FIG. 3B illustrates a schematic representation of the at least one second fluid reservoir 226 and the fluid dispenser 228, in accordance with an embodiment of the present disclosure. The at least one second fluid reservoir 226 may be embedded in the outer housing 222. In an embodiment, the at least one second fluid reservoir 226 may be disposed in the outer housing 222 and supported on the inner housing 200. The at least one second fluid reservoir 226 may be fluidically coupled to the at least one first fluid reservoir 224 via the at least one control valve 308 (as shown in FIG. 3C). Further, the fluid dispenser 228 includes a first end 228A mounted to the at least one second fluid reservoir 226 and a second end 228B positioned above the growth media 234 (or a top layer of the growth media 234). In an embodiment, the second end 228B of the fluid dispenser 228 is arranged above the growth media 234 along a periphery from a predefined distance of the inner housing 200. It is to be noted that a portion of the fluid dispenser 228 may be supported on the retainer member 206 of the inner housing 200, thus positioning the fluid dispenser 228 along the periphery of the inner housing 200. In an embodiment, the second end 228B of the fluid dispenser 228 may be submerged in the growth media 234. For example, the fluid dispenser 228 is a wick made of twisted fiber nylon materials. Additionally, or alternatively, the fluid dispenser 228 may be made of at least one of cotton, polyester, jute, coir, organic materials, non-woven natural fabrics, non-oven artificial fabrics, rope, hollow fibers, woven natural fabrics, oven artificial fabrics, synthetic materials, and the like. In an embodiment, the fluid dispenser 228 may be made of materials that contain mold inhibitors. Typically, mold growth may be inhibited by incorporating specific materials, structures, or substances that either prevent the mold growth or slow it down, into the materials of the fluid dispenser 228. Some examples of the mold inhibitors may include, but not limited to, silver based antimicrobial coatings such as Agion, copper based antimicrobial coatings such as Cupron, anti-organic epoxies such as EP42HT-2MED, plastics such as High-Density Polyethylene (HDPE), photocatalytic Titanium Dioxide ($TiO_2$) coatings that may be active-cleaned using ultraviolet (UV) light.

The fluid dispenser 228 is configured to dispense the fluid from the at least one second fluid reservoir 226 to the growth media 234 through capillary action. Typically, the capillary action of the fluid dispenser 228 allows the fluid (or the water) to flow in narrow spaces without the assistance of external forces (like gravity). This phenomenon occurs due to the combination of cohesive forces (the attraction between molecules of the water) and adhesive forces (the attraction between the water and the surface of the material). Further, the retainer members 206 may be configured to hold the fluid dispenser 228 in a stable position for enabling steady dispersal of the fluid from the at least one second fluid reservoir 226 to the growth media 234. Alternatively, the fluid dispenser 228 may dispense the fluid from the at least one second fluid reservoir 226 to the growth media 234 through any other type dispensing technique gravity-driven flow, siphon action, capillary electrophoresis, and the like.

In an embodiment, the fluid dispenser 228 may be integrally formed in the inner housing 200. Typically, peripheral walls of the inner housing 200 may be configured to include the fluid dispenser 228 made of wick material for dispensing the fluid from the at least one second fluid reservoir 226 to the growth media 234.

Figure 4A:
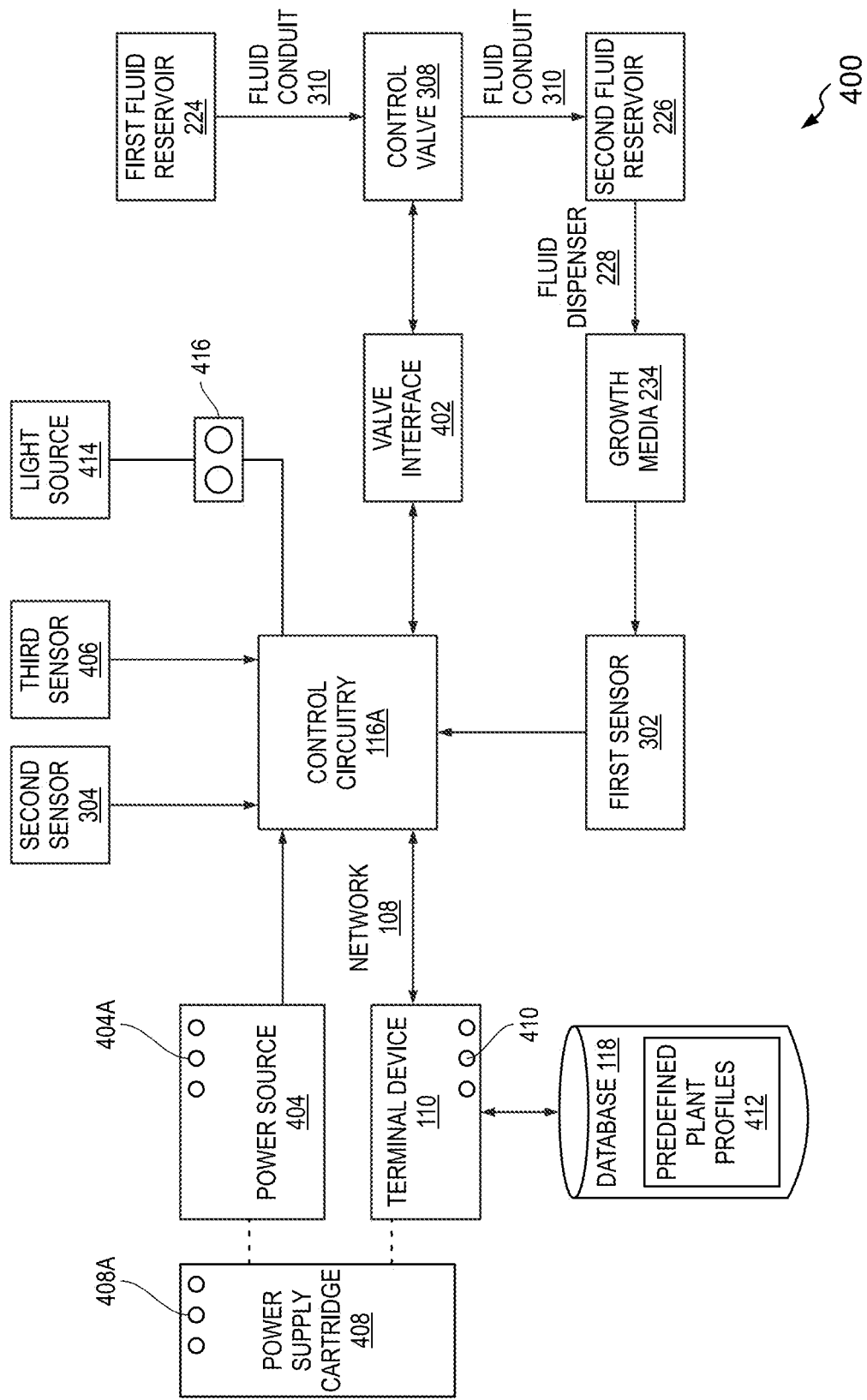
FIGS. 4A and 4B illustrate a block diagram representation of a plant irrigation system, in accordance with an example embodiment of the present disclosure.

Referring to FIG. 4A, a schematic block diagram representation 400 of a system for managing the irrigation schedule of the plant is illustrated, in accordance with an embodiment of the present disclosure. Herein, the components depicted in the schematic block diagram representation 400 and their interconnection with each other form the system. Hence, the schematic block diagram representation 400 may be referred to as the system 400. The system as shown in FIG. 4A may be equipped in the pot 112A.

In operation, the control circuitry 116A is configured to receive the ambient parameters of the environment, the one or more parameters related to the growth media 234, and the fluid level stored in the at least one first fluid reservoir 224. As explained above, the ambient parameters of the environment, the one or more parameters related to the growth media 234, and the fluid level stored in the at least one first fluid reservoir 224 are captured by the sensors 114A. Specifically, the first sensor 302 detects the one or more parameters (e.g., the moisture content) related to the growth media 234. The second sensor 304 detects the ambient parameters (e.g., ambient temperature, humidity, carbon dioxide ($CO_2$) levels) and light intensity) of the growth environment. Further, the third sensor 406 detects the fluid level measurement in the at least one first fluid reservoir 224. Herein, the ambient parameters of the growth environment, the one or more parameters related to the growth media 234, and the fluid level stored in the at least one first fluid reservoir 224 detected by the sensors 114A may be referred to as sensory data.

Further, the control circuitry 116A is configured to determine the fluid dispensing schedule for dispensing fluid to the growth media 234 based at least on the ambient parameters of the growth environment and the one or more parameters related to the growth media 234. Typically, the control circuitry 116A communicates the sensory data with the terminal device 110 via the network 108, the terminal device 110. The sensory data captured by the sensors 114A may be stored in the database 118 for future use.

Further, the fluid dispensing schedule is determined based at least on determining a relevance metric by matching the ambient parameters and the one or more parameters related to the growth media 234 with predefined plant profiles 412 stored in the terminal device 110. The terminal device 110 associated with the database 118 may store the predefined plant profiles 412. The predefined plant profiles 412 may be created by accumulating data related to moisture content of the growth media required for various plant varieties, plant growth phase, and the like. In other words, the predefined plant profiles 412 may be created by aggregating and processing data from a large number of terminal devices. The data from the terminal devices may include average soil moisture levels reported by a collection of healthy specimens of the same species monitored over their entire lifetimes. Thereafter, the predefined plant profiles 412 may be stored as a look-up table in the database 118 of the terminal device 110 for future use. Further, the control circuitry 116A with access to the terminal device 110 determines the relevance metric by matching the sensory data with the predefined plant profiles 412. Thereafter, the control circuitry 116A determines the fluid dispensing schedule among the predefined plant profiles 412 with the highest relevance metric. For example, the sensory data may be compared against the predefined plant profiles A, B, and C. In this scenario, the relevance metric determined for the predefined plant profiles A, B, and C relative to the sensory data may be 8, 9, and 7, respectively. Hence, the fluid dispensing schedule B is selected among the predefined plant profiles A, B, and C, as the fluid dispensing schedule B is associated with the highest relevance metric of 9. For description purposes, the relevance metric is explained with reference to numerical values. Alternatively, the relevance metric may be represented in other forms.

In addition, the sensory data may be rendered in the application 106 for providing access to the user 102. In this scenario, the user 102 may access the predefined plant profiles 412 for selecting the ideal irrigation profile (or the fluid dispensing schedule) among the predefined plant profiles 412 based on the sensory data.

Furthermore, the control circuitry 116A is configured to operate the at least one control valve 308 for dispensing the fluid to the growth media 234 based on the fluid dispensing schedule and the fluid level stored in the at least one first fluid reservoir 224. More specifically, operating the at least one control valve 308 enables the fluid stored in the at least one first fluid reservoir 224 to flow into the at least one second fluid reservoir 226. Further, the fluid in the at least one second fluid reservoir 226 is dispensed to the growth media 234 through the fluid dispenser 228 mounted to the at least one second fluid reservoir 226.

The control circuitry 116A may transmit control signals to the at least one control valve 308 through a valve interface 402. The valve interface 402 may include a wired or wireless communication protocol. The at least one control valve 308 operates between an ON state and an OFF state corresponding to the control signals received from the control circuitry 116A. As explained above, the fluid dispensing schedule includes at least a time period for operating the at least one control valve 308 in the ON state. The at least one control valve 308 in the ON state allows the flow of the fluid from the at least one first fluid reservoir 224 to the at least one second fluid reservoir 226 to dispense the fluid to the growth media 234, a flowrate of the fluid from the at least one first fluid reservoir 224 to the at least one second fluid reservoir 226, and a volume of the fluid to be dispensed to the growth media 234. In an embodiment, the time period for operating the at least one control valve 308 in the ON state and the flowrate for transporting the fluid from the at least one first fluid reservoir 224 to the at least one second fluid reservoir 226 is determined based at least on a flowrate associated with the fluid dispenser 228. The at least one control valve 308 is controlled by an actuator (not shown in figures). The actuator may be a servo motor connected to a traditional 2-way valve (i.e., the at least one control valve 308) which is bistable in both open and closed positions. Hence, energy is only required to change the position of the at least one control valve 308 and there is no requirement of energy for water movement once the at least one control valve 308 is opened. In an embodiment, the at least one control valve 308 may be a bistable solenoid valve.

As explained above, the fluid dispenser 228 dispenses the fluid from the at least one second fluid reservoir 226 to the growth media 234 by capillary action and gravity. In this scenario, the flowrate of the fluid through the fluid dispenser 228 may depend on several factors including but not limited to size and shape of the fluid dispenser 228, and relative height between the plurality of sensors 114A and the growth media 234. In another scenario, the at least one first fluid reservoir 224 may be positioned higher than the at least one second fluid reservoir 226 to ensure the flow of fluid by gravity. For example, the at least one control valve 308 in the ON state ensures the flow of fluid from the at least one first fluid reservoir 224 to the at least one second fluid reservoir 226 through the fluid conduits 310. Further, the fluid from the at least one second fluid reservoir 226 flows into the growth media 234 through the fluid dispenser 228 by capillary action. It is to be noted that the energy for water movement comes from stored gravitational potential energy (derived by storing water at an appropriate elevation at the time of filling the at least one first fluid reservoir 224) and capillary action within the fluid dispenser 228. The flowrate of the fluid dispenser 308 is generally extremely slow, but still typically faster than the rate of actual water consumed by most plants at peak transpiration. Hence, by varying the time duration for which the at least one control valve 308 is left open (i.e., the ON state), the control circuitry 116A is able to finely control the volume of the fluid dispensed into the growth media 234. For example, the volume of fluid to be dispensed to the growth media 234 for maintaining an average moisture level of the growth media 234 may be 2 Liters (L). Further, the flowrate of the fluid dispenser 228 may be 0.1 L per minute. Accordingly, the control circuitry 116A determines the time period for operating the at least one control valve 308 in the ON state.

Once the required volume of the fluid is dispensed to the growth media 234, the at least one control valve 308 is operated in the OFF state to restrict the flow of the fluid from the at least one first fluid reservoir 224 to the at least one second fluid reservoir 226. In this scenario, the fluid remaining in the at least one second fluid reservoir 226 may continue to flow through the fluid dispenser 228 onto the growth media 234 until the fluid in the at least one second fluid reservoir 226 exhausts. Additionally, the at least one second fluid reservoir 226 may be adjusted to a predefined height to ensure a sufficient flow rate of the fluid from the fluid dispenser 228 onto the growth media 234. However, the predefined height may further depend on the characteristics of the fluid dispenser 228.

In an embodiment, the at least one control valve 308 may be configured to control the composition of the fluid being dispensed, for example, water, nutrient, and fungicide. In an embodiment, nutrient mixes may be controllably added into the fluid chamber (i.e., the at least one first fluid reservoir 224). Hence, the nutrient mixes blended in the fluid are dispensed through the fluid dispenser 228 onto the growth media 234. In this way, the soil nutrients are delivered to the growth media over time in a controlled manner for enhancing the soil nutrients. The example of the predefined plant profiles and the determination of the fluid dispensing schedule are listed below:

Example Plant profile: This reflects time-series data listed over varying windows of time
Plant: *Hibiscus rosa-sinensis*
Growth Stage: Flowering
Day 1 (Target values):
   1 Moisture: 18%
   Ph: 6
Adjustments:
   If ambient temp<10 C: −5% moisture
   If ambient temp>35 C: +10% moisture
Absolute Ranges:
   Soil moisture: 10%-30%
   Ph: 5.5-7
Day 2 (Target Values):
   Moisture: 80%
   Ph: 6
Adjustments:
   If temp<10 C: −5% moisture
   If temp>35 C: +10% moisture
Absolute Ranges:
   Soil moisture: 30%-90
   Ph: 5.5-7
Week 1:
Average Ranges:
   Soil moisture 30-45%
   Ph: 5.5-7

The control circuitry 116A may be a Proportional-Integral-Derivative (PID) controller with tuned P, I, D parameters to toggle valve actuation in real time.
Input Feedback:
   Current media moisture (from sensor)
   Currently media temp (from sensor)
   Current ambient temp (from sensor)
   Currently ambient humidity (from sensor)
Input Target:
   Target soil moisture (from profile)
   Target soil nutrient level (from profile)
Outputs (Operate at Least One Control Valve 308):
   Valve #1 water ON/OFF
   Valve #2 nutrient1 ON/OFF
   Valve #3 nutrient2 ON/OFF In an embodiment, the control circuitry 116A may employ trained transformers to control the value actuation in real-time. The transformers may be trained with a training dataset. The training dataset may include the following data:
A) Long-term time series variation of all sensed ambient variables such as temperature, humidity, and light.
B) Long-term time series variation of all sensed growth media parameters such as soil moisture, pH, and conductivity.
C) Time series data on actively growing plant species, their counts and phases over time. The growth phase may either be inputted manually by users, or by automatic detection using trained photographic pattern recognition.

D) Time series data on outputted valve position(s) over time.
E) Time series training feedback of actively sensed target variable: growth media soil moisture.

Thus, a trained neural network based on the training dataset may be employed to accept current sensed inputs and provide a control valve position output in real time to maintain the desired soil moisture levels over time for any given growth target.

Additionally, the system may include a power source 404. For example, the power source 404 may include a rechargeable battery. The power source 404 may be configured to provide power supply to the control circuitry 116A, the sensors 114A, and the at least one control valve 308. The power source 404 may include a first electrical coupling member 404A. The first electrical coupling member 404A may be made of magnetic materials or any other materials as per design feasibility and requirements.

Further, the system includes a power supply cartridge 408. The power supply cartridge 408 includes a third electrical coupling member 408A. The power supply cartridge 408 may be referred to as a battery cartridge or a power bank. The third electrical coupling member 408A may be configured to couple with a second electrical coupling member 410 of the terminal device 110. This enables charging of the power supply cartridge 408 through the terminal device 110. Typically, the terminal device 110 may include a power supply (not shown in figures). The energy from the power supply of the terminal device 110 is transmitted to the power supply cartridge 408 when the third electrical coupling member 408A and the second electrical coupling member 410 are electrically coupled to each other. Furthermore, the third electrical coupling member 408A is configured to connect with the first electrical coupling member 404A for charging the power source 404. In other words, the terminal device 110 may serve a secondary purpose of battery charging and can allow for charging a battery pod (i.e., the power supply cartridge 408). Further, the power supply cartridge 408 may be removed and connected to the power source 404 for charging the power source 404.

In an embodiment, the control circuitry 116A may be equipped with a photovoltaic (PV) cell. The PV cell may be configured to recharge the power supply cartridge 408.

In addition, the system may include at least one light source 414 communicably coupled to the control circuitry 116A via an actuator 416. The at least one light source 414 may be connected to the control circuitry 116A using a wired or wireless communication protocol. The control circuitry 116A is configured to control the at least one light source 414 through the actuator 416 based at least on an ideal luminance range defined for the plant. The ideal luminance range may be stored in the predefined plant profiles. In an embodiment, the at least one light source 414 may function based on binary inputs (i.e., ON/OFF state).

Figure 4B:
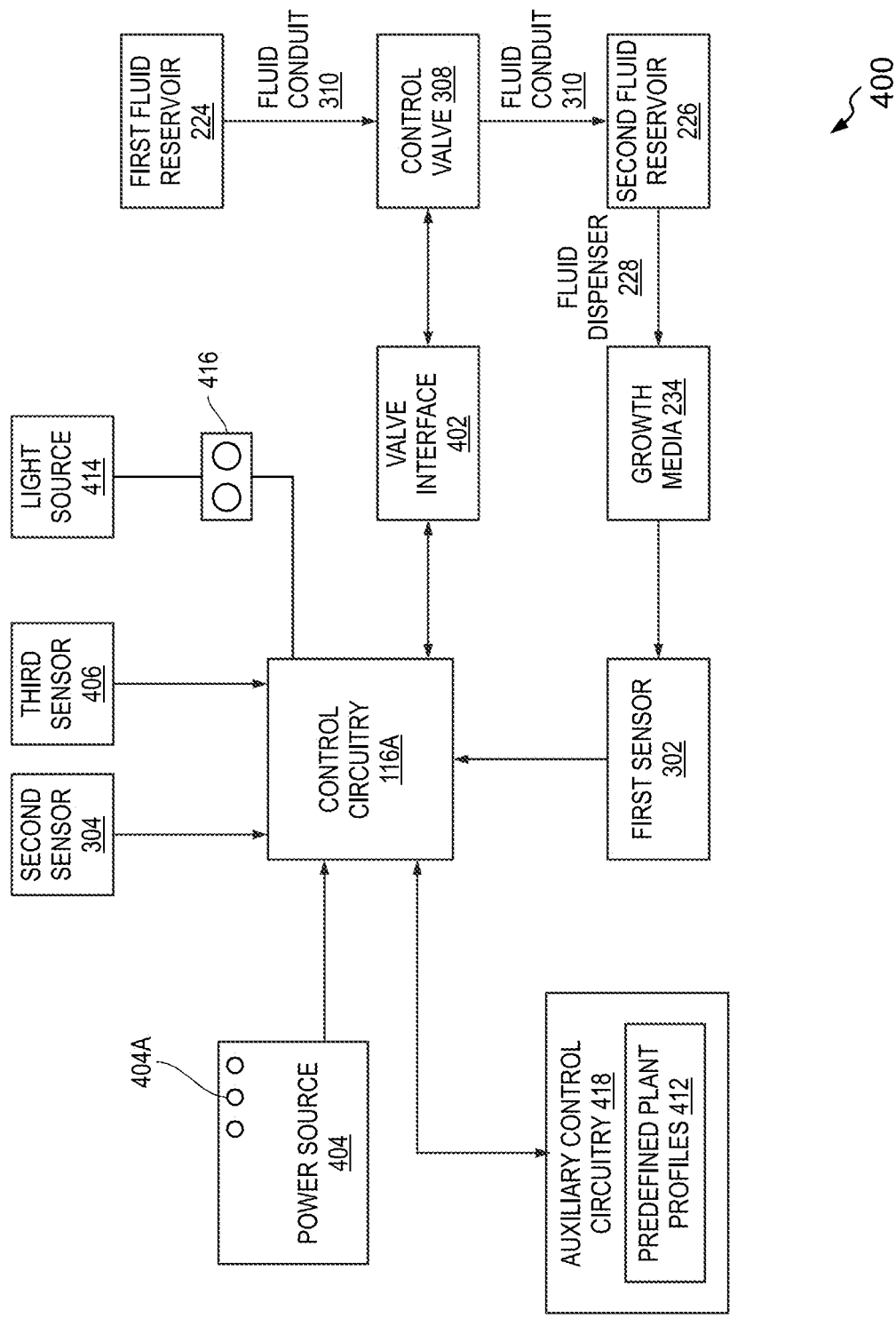

In an embodiment, the system may include an auxiliary control circuitry 418 (as shown in FIG. 4B). The auxiliary control circuitry 418 may be equipped/housed in the inner housing 200. The auxiliary control circuitry 418 is communicably coupled to the control circuitry 116A (as shown in FIG. 4B). The auxiliary control circuitry 418 is configured to store the predefined plant profiles 412. In one embodiment, the auxiliary control circuitry 418 may include a non-volatile memory (not shown in figures) configured to store the predefined plant profiles 412 associated with the plant equipped in the pot 112A. Further, the auxiliary control circuitry 412 may communicate the predefined plant profiles to the control circuitry 116A for determining the fluid dispensing schedule. Thus, the inner housing 200 includes both the plant information in the form of the unique identifier 230 and the predefined plant profiles 412. In other words, the plant information of the plant equipped in the pot 116A and the predefined plant profiles 412 are co-located with the pot 116A. This way, if a user swaps the plant (i.e., swaps out one inner housing 200), the control circuitry 116A automatically receives the required plant profile data from the predefined plant profiles without needing to contact the terminal device 110. In some embodiments, the predefined plant profiles 412 are embedded in the inner housing 200 in the form of a unique code (such as RFID data or expanded QR code). In this way, the control circuitry 116A may access the predefined plant profiles 412 embedded in the inner housing 200.

Figure 5B:
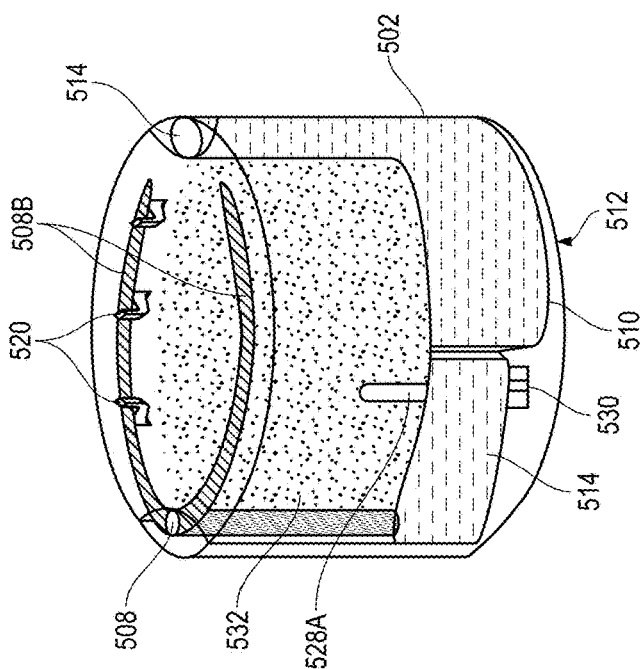
FIGS. 5A and 5B illustrate a schematic representation of a pot, in accordance with an embodiment of the present disclosure.
Figure 5A:
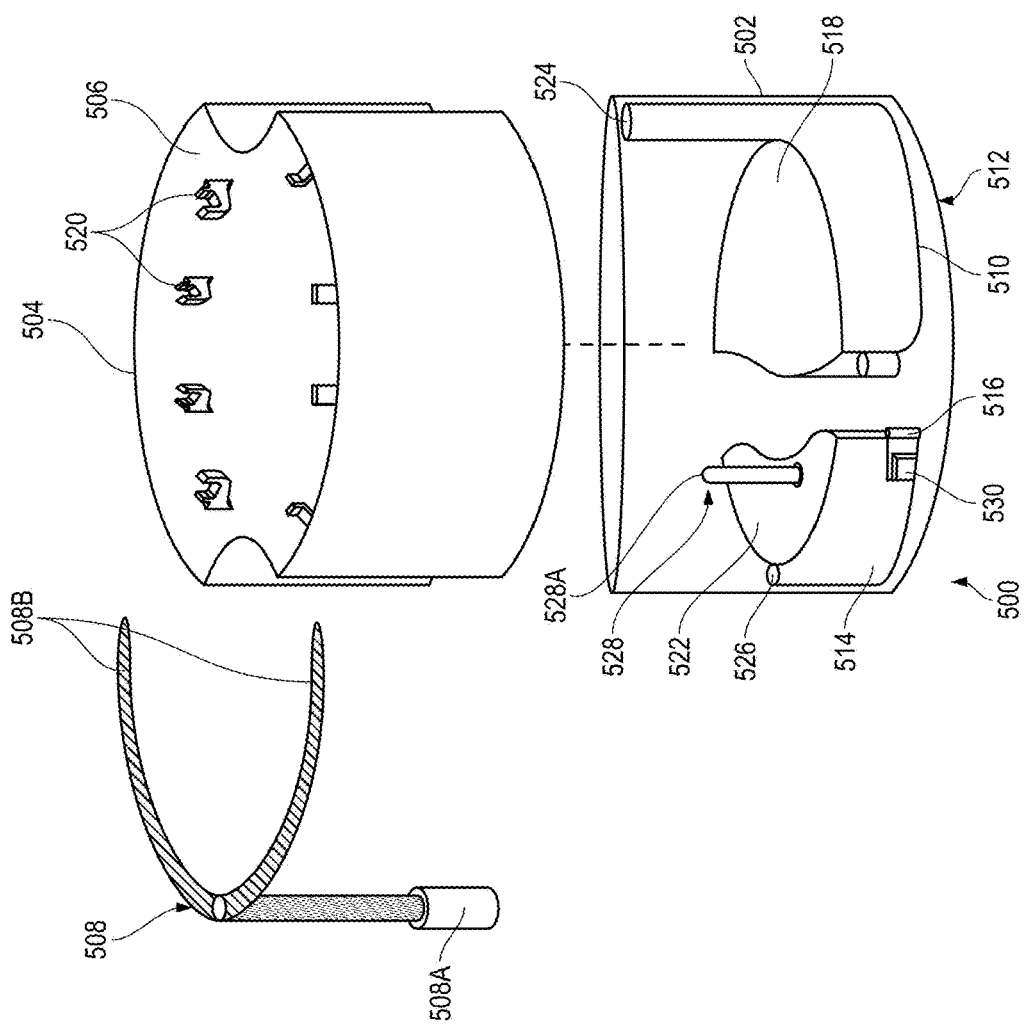

FIG. 5A illustrates a schematic representation of an exploded view of a pot 500, in accordance with an embodiment of the present disclosure. The pot 500 is an example of the pot 112A and the pot 112B. The pot 500 includes an outer housing 502 and an inner housing 504. The inner housing 504 is configured to receive a growth media 532 (as shown in FIG. 5B) for supporting a plant in the pot 500. As explained above, the growth media 532 may include soil, potting mix, peat moss, coco-coir, sand and gravel, and the like. The inner housing 504 may be configured to reinforce and support all parts of the pot 500. Further, the inner housing 504 is configured with a plurality of retainer members 520 (also referred to as retainer members 520). More specifically, the plurality of retainer members 520 is configured on an inner surface 506 of the inner housing 504. The plurality of retainer members 520 may be configured to support a fluid dispenser (see, 508 of FIG. 5A). Further, each retainer member of the plurality of retainer members 520 may be configured at regular intervals. In an embodiment, the retainer members 520 may be configured corresponding to the positioning of the fluid dispenser 508.

Further, the outer housing 502 is configured to accommodate at least one first fluid reservoir 510. The at least one first fluid reservoir 510 is positioned at a bottom portion 512 of the outer housing 502. Further, the pot 500 includes at least one second fluid reservoir 514. The at least one second fluid reservoir 514 is disposed at the bottom portion 512 of the outer housing 502. The at least one second fluid reservoir 514 is fluidically coupled to the at least one first fluid reservoir 510 via at least one control valve 516. As explained above, the at least one control valve 516 may include a two-way valve. Alternatively, the at least one control valve 516 may include other types of valves such as a gate valve, a ball valve, a butterfly valve, a diaphragm valve, a shear valve, a pinch valve, and a check valve. It is to be noted that the at least one first fluid reservoir 510 and the at least one second fluid reservoir 514 are positioned at the same level for receiving the inner housing 504. In other words, the inner housing 504 is positioned over a top surface 518 of the at least one first fluid reservoir 510 and a top surface 522 of the at least one second fluid reservoir 514.

Furthermore, the at least one first fluid reservoir 510 is configured with an inlet 524 for receiving the fluid therein. Similarly, the at least one second fluid reservoir 514 is configured with an inlet 526 for allowing insertion of the fluid dispenser 508 therein. The fluid dispenser 508 includes at least one first end 508A inserted to the inlet 526 of the at least one second fluid reservoir 514, and at least one second end 508B disposed parallel to (or positioned above) the growth media 532. Hence, the fluid from the at least one second fluid reservoir 514 is dispensed to the growth media 532 through the fluid dispenser 508.

The pot 500 is further equipped with a plurality of sensors 528 (also referred to as sensors 528) and a control circuitry 530. Similar to the sensors 114A, the sensors 528 may include a first sensor (see, 528A of FIG. 5A), a second sensor (not shown in figures), and a third sensor (not shown in figures). As shown, the first sensor 528A is positioned on the at least one second fluid reservoir 514 and is substantially disposed in the growth media 532 by inserting the first sensor 528A through an opening (not shown in figures) configured in the inner housing 504. The sensors 528 are configured to detect ambient parameters of the growth environment, one or more parameters related to the growth media 532, and fluid level stored in the at least one first fluid reservoir 510. Accordingly, the control circuitry 530 is configured to determine the fluid dispensing schedule for dispensing the fluid to the growth media 532. The fluid dispensing schedule is determined based at least on determining a relevance metric by matching the ambient parameters and the one or more parameters related to the growth media 532 with the predefined plant profiles stored in a terminal device (e.g., the terminal device 110). Thereafter, the control circuitry 530 operates the at least one control valve 516 for dispensing the fluid to the growth media 532 based at least on the fluid dispensing schedule and the fluid level stored in the at least one first fluid reservoir 510. Further, operating the at least one control valve 516 enables the fluid stored in the at least one first fluid reservoir 510 to flow into the at least one second fluid reservoir 514 and is further dispensed to the growth media 532 through the fluid dispenser 508. Furthermore, the one or more operations related to dispensing the fluid to the growth media 532 based on the data captured by the sensors 528 are explained above, hence they are not reiterated herein for the sake of brevity.

Figure 6:
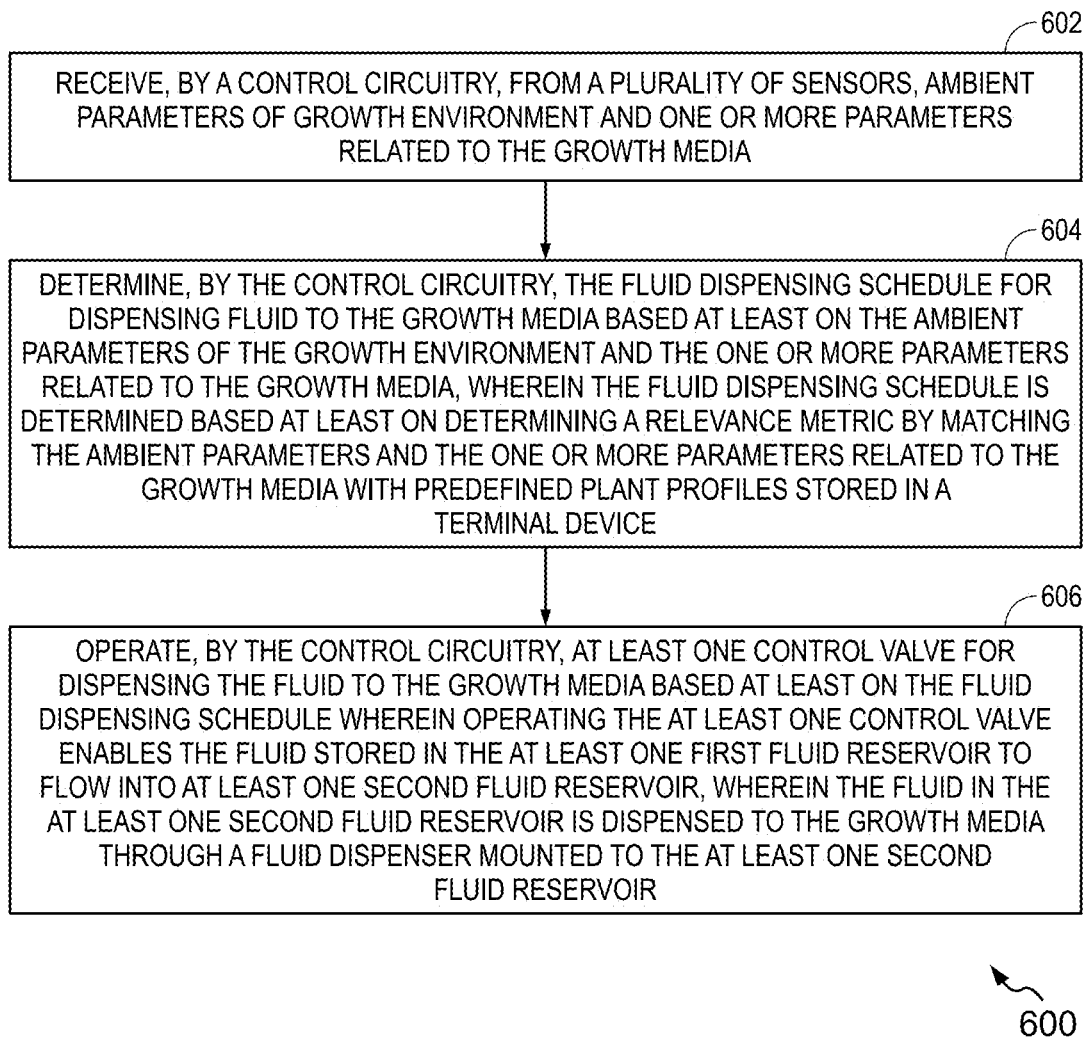
FIG. 6 illustrates a flow diagram of a method for managing plant irrigation schedules, in accordance with an embodiment of the present disclosure.

FIG. 6 illustrates a flow diagram of a method 600 for determining the fluid dispensing schedule, in accordance with an embodiment of the present disclosure. The method 600 depicted in the flow diagram may be executed by, for example, the plurality of sensors 114A/114B/528 and the control circuitry 116A/530. Operations of the flow diagram of the method 600, and combinations of the operations in the flow diagram of the method 600, may be implemented by, for example, hardware, firmware, a processor, circuitry, and/or a different device associated with the execution of software that includes one or more computer program instructions. The method 600 starts at operation 602.

At operation 602, the method 600 includes receiving, by the control circuitry 116A, from the plurality of sensors 114A, the ambient parameters of the growth environment 234, one or more parameters related to the growth media 234, and the fluid level stored in at least one first fluid reservoir 224.

At operation 604, the method 600 includes determining, by the control circuitry 116A, the fluid dispensing schedule for dispensing fluid to the growth media 234 based at least on the ambient parameters of the growth environment and the one or more parameters related to the growth media 234. The fluid dispensing schedule is determined based at least on determining the relevance metric by matching the ambient parameters and the one or more parameters related to the growth media 234 with predefined plant profiles stored in the terminal device 110.

At operation 606, operating, by the control circuitry 116A, the at least one control valve 308 for dispensing the fluid to the growth media 234 based at least on the fluid dispensing schedule and the fluid level stored in the at least one first fluid reservoir 224. Further, operating the at least one control valve 308 enables the fluid stored in the at least one first fluid reservoir 224 to flow into the at least one second fluid reservoir 226. The fluid in the at least one second fluid reservoir 226 is dispensed to the growth media 234 through the fluid dispenser 228 mounted to the at least one second fluid reservoir 226. Further, the one or more operations related to managing the plant irrigation schedules are explained in detail with references to FIG. 1 to FIGS. 5A-5B, therefore they are not reiterated herein for the sake of brevity.

Figure 7:
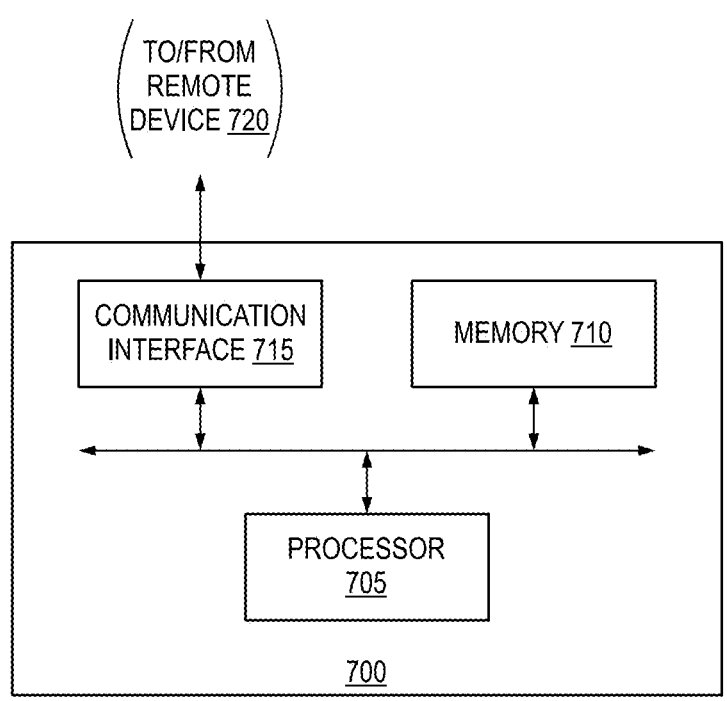
FIG. 7 illustrates a simplified block diagram representation of a control circuitry, in accordance with an embodiment of the present disclosure.

FIG. 7 illustrates a simplified block diagram representation of a system 700, in accordance with an embodiment of the present disclosure. In an embodiment, the system 700 is an example of the control circuitry 116A/116B/530. In another embodiment, the system 700 may be an example of the terminal device 110. The system 700 includes at least one processor 705 for executing instructions. Instructions may be stored in, for example, but not limited to, a memory 710. Further, the memory 710 may store the plant information, the sensory data detected by the sensors (i.e., the first sensor 302, the second sensor 304, and the third sensor 406), and the like. The memory 710 may be embodied as one or more volatile memory devices, one or more non-volatile memory devices, and/or a combination of one or more volatile memory devices and non-volatile memory devices. For example, the memory 710 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In an embodiment, the processor 705 may include one or more processing units (e.g., in a multi-core configuration). Examples of the processor 705 include, but are not limited to, an application-specific integrated circuit (ASIC) processor, a reduced instruction set computing (RISC) processor, a complex instruction set computing (CISC) processor, a field-programmable gate array (FPGA), and the like. The processor 705 is operatively coupled to a communication interface 715 and is capable of communicating with a remote device 720 such as the user device 104. The communication interface 715 may include communication circuitry such as, a transceiver circuitry including an antenna and other communication media interfaces to connect to a wired and/or wireless communication network. The communication circuitry may, in at least some example embodiments, enable the transmission of data signals or control signals or receipt of the user inputs. The one or more operations performed by the system 700 are already explained with references to FIG. 6, therefore they are not reiterated herein for the sake of brevity.

Advantages

The plant irrigation system of the present disclosure using a fluid dispenser ensures low-power fluid delivery over a wide range of quantities for a longer time period. The energy frugality afforded by the fluid dispenser-based fluid delivery mechanism results in the plant irrigation system of the present disclosure being fully wireless and portable.

The configuration of the plant irrigation system including the inner housing with a high strength-to-weight ratio, the retainer members, and the bifurcated structure of the inner housing ensures housing a large variety of plants over a large range of the growth periods and changing root balls of predefined sizes.

The plant irrigation system of the present disclosure includes cloud-based backend system and the networked communication between the plurality of sensors, control circuitry and the terminal device. Such configuration ensures gathering plant information including plant type, plant category and plant growth phase, and creating ideal fluid dispensing schedules for improving the plant irrigation.

The present disclosure suggests an ultra-low-power plant irrigation system that may fully sustain plant growth of a large variety of species. Further, the sensory data received from the plurality of sensors allows users to determine whether optimal environmental conditions are being maintained at any given moment or over a specified period of time.

The plant irrigation system of the present disclosure includes minimal intervention by the user. Further, the presence of sufficient fluid reserves and power storage capacity enables the user to leave plants unattended for weeks at a time, and provides reliable data confirming ideal conditions being maintained.

The present disclosure enables users to obtain a comprehensive overview of specific environmental conditions at any location within their home, building, or outdoor environment.

The present disclosure suggests a complete wireless plant irrigation system that offers closed-looped fine-grained variable fluid control.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

What is claimed is:

1. A system, comprising:
an outer housing;
an inner housing disposed in the outer housing, the inner housing configured to receive growth media for supporting a plant;
at least one first fluid reservoir;
at least one second fluid reservoir, wherein the at least one second fluid reservoir fluidically coupled to the at least one first fluid reservoir via at least one control valve;
a plurality of sensors configured to detect ambient parameters of growth environment and one or more parameters related to the growth media; and
a control circuitry operatively coupled to the at least one control valve, the plurality of sensors, and a terminal device, the control circuitry configured to at least:
  receive, from the plurality of sensors, the ambient parameters of the growth environment and the one or more parameters related to the growth media,
  determine a fluid dispensing schedule for dispensing fluid to the growth media based at least on the ambient parameters of the growth environment and the one or more parameters related to the growth media, wherein the fluid dispensing schedule is determined based at least on determining a relevance metric by matching the ambient parameters and the one or more parameters related to the growth media with predefined plant profiles stored in the terminal device, and
  operate the at least one control valve for dispensing the fluid to the growth media based at least on the fluid dispensing schedule,
    wherein operating the at least one control valve enables the fluid stored in the at least one first fluid reservoir to flow into the at least one second fluid reservoir, and
    wherein the fluid in the at least one second fluid reservoir is dispensed to the growth media through a fluid dispenser mounted to the at least one second fluid reservoir.

2. The system as claimed in claim 1, wherein the fluid dispensing schedule comprises at least a time period for operating the at least one control valve in an ON state for allowing the flow of the fluid from the at least one first fluid reservoir to the at least one second fluid reservoir to dispense the fluid to the growth media, a flowrate of the fluid from the at least one first fluid reservoir to the at least one second fluid reservoir, a volume of the fluid to be dispensed to the growth media.

3. The system as claimed in claim 2, wherein the time period for operating the fluid control valve in the ON state and the flowrate for transporting the fluid from the at least one first fluid reservoir to the at least one second fluid reservoir is determined based at least on a flowrate associated with the fluid dispenser.

4. The system as claimed in claim 1, wherein the plurality of sensors comprises:
a first sensor housed in a casing, the first sensor being inserted through a slit defined in the inner housing and substantially positioned in the growth media stored in the inner housing, the first sensor configured to detect the one or more parameters related to the growth media, the one or more parameters comprising one or more of moisture content of the growth media, pH level, evapotranspiration from the growth media, fluid holding capacity of the growth media, nutrient content of the growth media;
a second sensor housed in the casing, the second sensor configured to detect the ambient parameters of the growth environment, the ambient parameters comprising one or more of ambient temperature, humidity, carbon dioxide ($CO_2$) levels and light intensity; and
a third sensor configured to detect fluid level measurement and conductance in the at least one first fluid reservoir.

5. The system as claimed in claim 1, wherein the inner housing comprises at least one first part and at least one second part, the at least one first part comprising at least one engaging member and the at least one second part comprising at least one complementary engaging member, wherein the at least one engaging member of the at least one first part is removably engaged with the at least one complementary engaging member for detachably coupling the at least one first part and the at least one second part with each other to form the inner housing.

6. The system as claimed in claim 1, wherein the at least one first fluid reservoir, the at least one second fluid reservoir, and a casing are disposed in a region defined between a neck portion and a shoulder portion of the inner housing and an inner circumferential surface of the outer housing, while the inner housing is inserted in the outer housing, the casing configured to encase the plurality of sensors and the control circuitry.

7. The system as claimed in claim 1, wherein the fluid dispenser corresponds to a wick made of at least cotton, polyester, twisted fiber nylon materials, jute, coir, organic materials, non-woven natural fabrics, non-oven artificial fabrics, rope, hollow fibers, woven natural fabrics, oven artificial fabrics, the fluid dispenser comprising a first end mounted to the at least one second fluid reservoir, and a second end suspended along a periphery at a predefined distance from the inner housing and positioned above the growth media, and
   wherein the fluid dispenser is configured to dispense the fluid from the at least one second fluid reservoir to the growth media through capillary action.

8. The system as claimed in claim 7, wherein the first end of the fluid dispenser is mounted to the at least one second fluid reservoir and the second end of the fluid dispenser is positioned in the growth media.

9. The system as claimed in claim 7, wherein the inner housing is configured with a plurality of retainer members, the plurality of retainer members configured to receive a portion of the fluid dispenser mounted to the at least one second fluid reservoir, thereby positioning the fluid reservoir along a periphery of the inner housing.

10. The system as claimed in claim 1, further comprising:
    a unique identifier embedded on a portion of the inner housing storing the growth media and supporting the plant, wherein the unique identifier is encoded with plant information associated with the plant equipped in the inner housing, the plant information comprising at least a plant type, plant category, and plant growth phase; and
    a unique identifier reader communicably coupled to the control circuitry, the unique identifier reader configured to retrieve the plant information of the plant equipped in the inner housing upon scanning the unique identifier, wherein the control circuitry is configured to render the plant information in an application equipped in a user device of a user.

11. The system as claimed in claim 1, further comprising an auxiliary control circuitry housed in the inner housing and communicably coupled to the control circuitry, wherein the auxiliary control circuitry is configured to store the predefined plant profiles and communicate the predefined plant profiles to the control circuitry for determining the fluid dispensing schedule.

12. The system as claimed in claim 1, further comprising:
    a power source configured to provide power supply to the plurality of sensors and the control circuitry, the power source comprising a first electrical coupling member; and
    a power supply cartridge comprising a third electrical coupling member, the third electrical coupling member of the power supply cartridge configured to couple with a second electrical coupling member of the terminal device thereby enabling charging of the power supply cartridge through the terminal device, wherein the third electrical coupling member is configured to connect with the first electrical coupling member for charging the power source.

13. The system as claimed in claim 1, wherein the inner housing is configured with a plurality of holes housing for enabling drainage of excess fluid, moisture, and evaporation from the growth media.

14. The system as claimed in claim 1, further comprising:
    at least one light source communicably coupled to the control circuitry via an actuator, wherein the control circuitry is configured to control the at least one light source through the actuator based at least on an ideal luminance range defined for the plant.

15. A method, comprising:
    receiving, by a control circuitry, from a plurality of sensors, ambient parameters of growth environment and one or more parameters related to the growth media;
    determining, by the control circuitry, a fluid dispensing schedule for dispensing fluid to the growth media based at least on the ambient parameters of the growth environment and the one or more parameters related to the growth media, wherein the fluid dispensing schedule is determined based at least on determining a relevance metric by matching the ambient parameters and the one or more parameters related to the growth media with predefined plant profiles stored in a terminal device; and
    operating, by the control circuitry, at least one control valve for dispensing the fluid to the growth media based at least on the fluid dispensing schedule,
        wherein operating the at least one control valve enables the fluid stored in the at least one first fluid reservoir to flow into at least one second fluid reservoir, and
        wherein the fluid in the at least one second fluid reservoir is dispensed to the growth media through a fluid dispenser mounted to the at least one second fluid reservoir.

16. The method as claimed in claim 15, wherein the fluid dispensing schedule comprises at least a time period for operating the at least one control valve in an ON state for allowing the flow of the fluid from the at least one first fluid reservoir to the at least one second fluid reservoir to dispense the fluid to the growth media, a flowrate of the fluid from the at least one first fluid reservoir to the at least one second fluid reservoir, and a volume of the fluid to be dispensed to the growth media.

17. The method as claimed in claim 15, wherein the time period for operating the fluid control valve in the ON state and the flowrate for transporting the fluid from the at least one first fluid reservoir to the at least one second fluid reservoir is determined based at least on a flowrate associated with the fluid dispenser.

18. The method as claimed in claim 15, wherein the one or more parameters related to the growth media comprise at least moisture content of the growth media, pH level, evapotranspiration from the growth media, fluid holding capacity of the growth media, nutrient content of the growth media, and wherein the ambient parameters of the growth environment comprise at least ambient temperature, humidity, and light intensity.

19. The method as claimed in claim 15, further comprising:
    analyzing, by the control circuitry via a unique identifier reader, a unique identifier embedded on a portion of an inner housing storing the growth media and supporting a plant, wherein the unique identifier is encoded with plant information associated with the plant equipped in the inner housing, the plant information comprising at least a plant type, plant category, and plant growth phase; and
    upon scanning the unique identifier, rendering, by the control circuitry, plant information in an application equipped in a user device of a user, wherein the fluid dispensing schedule is determined based on the plant information being retrieved by scanning the unique identifier.

20. A system for determining a fluid dispensing schedule, comprising:
- an outer housing;
- an inner housing disposed in the outer housing, the inner housing configured to receive growth media for supporting a plant;
- at least one first fluid reservoir;
- at least one second fluid reservoir, wherein the at least one second fluid reservoir fluidically coupled to the at least one first fluid reservoir via at least one control valve;
- a plurality of sensors configured to detect ambient parameters of the growth environment and one or more parameters related to the growth media; and
- a control circuitry operatively coupled to the at least one control valve, the plurality of sensors, and a terminal device, the control circuitry configured to at least:
  - receive, from the plurality of sensors, the ambient parameters of the growth environment and the one or more parameters related to the growth media,
  - determine the fluid dispensing schedule for dispensing fluid to the growth media based at least on the ambient parameters of the growth environment and the one or more parameters related to the growth media, wherein the fluid dispensing schedule is determined based at least on determining a relevance metric by matching the ambient parameters and the one or more parameters related to the growth media with predefined plant profiles stored in the terminal device, and
  - operate the at least one control valve for dispensing the fluid to the growth media based at least on the fluid dispensing schedule,
    - wherein operating the at least one control valve enables the fluid stored in the at least one first fluid reservoir to flow into the at least one second fluid reservoir, and
    - wherein the fluid in the at least one second fluid reservoir is dispensed to the growth media through a fluid dispenser mounted to the at least one second fluid reservoir, and
    - wherein the fluid dispensing schedule comprises at least a time period for operating the at least one control valve in an ON state for allowing the flow of the fluid from the at least one first fluid reservoir to the at least one second fluid reservoir to dispense the fluid to the growth media, a flowrate of the fluid from the at least one first fluid reservoir to the at least one second fluid reservoir, and a volume of the fluid to be dispensed to the growth media.

21. The system as claimed in claim 20, wherein the time period for operating the fluid control valve in the ON state and the flowrate for transporting the fluid from the at least one first fluid reservoir to the at least one second fluid reservoir is determined based at least on a flowrate associated with the fluid dispenser.

22. The system as claimed in claim 20, wherein the fluid dispenser corresponds to a wick made of at least cotton, polyester, twisted fiber nylon materials, jute, coir, organic materials, non-woven natural fabrics, non-oven artificial fabrics, rope, hollow fibers, woven natural fabrics, oven artificial fabrics, the fluid dispenser comprising a first end mounted to the at least one second fluid reservoir, and a second end suspended along a periphery at a predefined distance from a periphery of the inner housing and positioned above the growth media, and
  wherein the fluid dispenser is configured to dispense the fluid from the at least one second fluid reservoir to the growth media through capillary action.

23. The system as claimed in claim 20, wherein the first end of the fluid dispenser is mounted to the at least one second fluid reservoir and the second end of the fluid dispenser is positioned in the growth media.

24. The system as claimed in claim 20, wherein the one or more parameters related to the growth media comprise at least moisture content of the growth media, pH level, evapotranspiration from the growth media, fluid holding capacity of the growth media, nutrient content of the growth media, and wherein the ambient parameters of the growth environment comprise at least ambient temperature, humidity, carbon dioxide ($CO_2$) levels, and light intensity.

* * * * *